(12) United States Patent
Marine et al.

(10) Patent No.: US 11,080,343 B1
(45) Date of Patent: Aug. 3, 2021

(54) ITERATIVE SEARCH TOOL AND USER INTERFACE

(71) Applicants: Larry Dean Marine, Colorado Springs, CO (US); John M. Ireland, Guilford, CT (US)

(72) Inventors: Larry Dean Marine, Colorado Springs, CO (US); John M. Ireland, Guilford, CT (US)

(73) Assignee: Iterative Search, LLC, Guilford, CT (US)

( * ) Notice: Subject to any disclaimer, the term of this patent is extended or adjusted under 35 U.S.C. 154(b) by 311 days.

(21) Appl. No.: 15/214,119

(22) Filed: Jul. 19, 2016

Related U.S. Application Data (60) Provisional application No. 62/231,883, filed on Jul. 20, 2015.

(51) Int. Cl.
| | |
|---|---|
| *G06F 16/951* | (2019.01) |
| *H04L 29/08* | (2006.01) |
| *G06N 3/08* | (2006.01) |
| *G06N 3/04* | (2006.01) |
| *G06F 3/0482* | (2013.01) |
| *G06F 3/0484* | (2013.01) |
| *G06F 16/25* | (2019.01) |
| *G06F 16/248* | (2019.01) |
| *G06F 16/9032* | (2019.01) |

(52) U.S. Cl.
CPC .......... *G06F 16/951* (2019.01); *G06F 3/0482* (2013.01); *G06F 3/04842* (2013.01); *G06F 16/248* (2019.01); *G06F 16/25* (2019.01); *G06F 16/90324* (2019.01); *G06N 3/0427* (2013.01); *G06N 3/08* (2013.01); *H04L 67/02* (2013.01)

(58) Field of Classification Search
CPC ............. G06F 17/30864; G06F 3/0482; G06F 3/04842; G06F 17/30554; G06F 17/30557; G06F 17/3097; G06N 3/0427; G06N 3/08; H04L 67/02
See application file for complete search history.

(56) References Cited

U.S. PATENT DOCUMENTS

| | | | |
|---|---|---|---|
| 2008/0040693 A1* | 2/2008 | Toyama | G06Q 10/06311 715/865 |
| 2009/0327251 A1* | 12/2009 | Walmer | G06Q 30/02 |
| 2010/0198813 A1* | 8/2010 | Chi | G06F 17/30864 707/722 |
| 2011/0191314 A1* | 8/2011 | Howes | G06F 17/30864 707/706 |
| 2011/0196864 A1* | 8/2011 | Mason | G06F 3/0416 707/728 |
| 2013/0211963 A1* | 8/2013 | Williams | G06Q 30/04 705/26.43 |

(Continued)

*Primary Examiner* — Ashish Thomas
*Assistant Examiner* — Dustin D Eyers
(74) *Attorney, Agent, or Firm* — McCormick, Paulding & Huber PLLC (57) ABSTRACT

A user interface provides functionality organized to support iterative search tasks for software or browser-based searches. These features may be combined with existing software and browser-based search engines to provide more extensive search features that are otherwise unsupported by existing search engine user interfaces. The user interface can be applied to varying search domains, from constrained search environments, such as a corporate database, or to the Internet.

20 Claims, 12 Drawing Sheets

(56) References Cited

U.S. PATENT DOCUMENTS

2014/0046934 A1\* 2/2014 Zhou ................. G06F 16/24526
707/723
2015/0161239 A1\* 6/2015 Stepinski ................ G06F 17/30
707/765

\* cited by examiner

ITERATIVE SEARCH TOOL AND USER INTERFACE

CROSS REFERENCE TO RELATED APPLICATION

This application claims the benefit under 35 U.S.C. § 119(e) of U.S. Provisional Application No. 62/231,883, filed on Jul. 20, 2015, which is hereby incorporated by reference in its entirety.

FIELD

This specification relates generally to electronic search tools, and more particularly to methods, apparatus and interfaces for enabling iterative search strategies.

BACKGROUND

Complex research is a multi-step, iterative process that includes broadening your knowledge of the domain, identifying new search paths, focusing the search, and selecting a few specific results. Typical search engines, like Google™, Bing® and Yahoo!®, are single session tools that do not support multi-session complex research. Accordingly, there is a need for a research tool that supports iterative searching for longer term, more complex research tasks.

SUMMARY

In accordance with one aspect of the present application, provided is a system for searching electronic records. The system includes a data storage device comprising a database and an iterative search engine, and a processor connected to the data storage device for executing the iterative search engine. The processor executes the iterative search engine to: communicate with a remote device via a network; render a web-based graphical user interface on the remote device; communicate with the remote device to receive a search query; save the received search query in the database; generate a listing of search results on the web-based graphical user interface on the remote device in response to the received search query; receive a user input via the web-based graphical user interface flagging, highlighting and/or annotating a selected one of the search results; and save the selected one of the search results and corresponding flag, highlight and/or annotation in association with the corresponding saved search query.

In accordance with another aspect of the present application, provided is a system that includes a data storage device comprising a database and an iterative search tool; and a processor connected to the data storage device for executing the iterative search tool. The processor executes the iterative search tool to: communicate with a remote device and a remote search engine via a network; render a web-based graphical user interface on the remote device; receive a search query from the remote device; save the received search query in the database; send the receive search query to the remote search engine; receive search results from the remote search engine in response to the sent search query; generate a listing of the search results received from the remote search engine on the web-based graphical user interface on the remote device in response to the received search query; receive a user input via the web-based graphical user interface flagging, highlighting and/or annotating a selected one of the search results; and save the selected one of the search results and corresponding flag, highlight and/or annotation in the database in association with the corresponding saved search query.

In accordance with another aspect of the present application, provided is a non-transitory, tangible computer-readable medium storing instructions adapted to be executed by a computer processor to perform a method for iterative searching. The method comprising the steps of: communicating with a remote device and a remote search engine via a network; rendering a web-based graphical user interface on the remote device; receiving a search query from the remote device; saving the received search query in a database; sending the receive search query to the remote search engine; receiving search results from the remote search engine in response to the sent search query; generating a listing of the search results received from the at least one remote search engine on the web-based graphical user interface on the remote device in response to the received search query; receiving a user input via the web-based graphical user interface flagging, highlighting and/or annotating a selected one of the search results; and saving the selected one of the search results and corresponding flag, highlight and/or annotation in the database in association with the corresponding saved search query.

BRIEF DESCRIPTION OF THE DRAWINGS

The foregoing summary, as well as the following detailed description of exemplary embodiments, is better understood when read in conjunction with the appended drawings. For illustration purposes, exemplary embodiments are shown in the drawings, it being understood, however, that the present application is not limited to the specific embodiments disclosed. In the drawings.

DETAILED DESCRIPTION

Before the various embodiments are described in further detail, it is to be understood that the present application is not limited to the particular embodiments described. It will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. It is also to be understood that the terminology used is for the purpose of describing particular embodiments only, and is not intended to limit the scope of the claims of the present application.

In the drawings, like reference numerals refer to like features of the systems and methods of the present application. Accordingly, although certain descriptions may refer only to certain Figures and reference numerals, it should be understood that such descriptions might be equally applicable to like reference numerals in other Figures.

The present application is directed to an iterative search tool 10. Iterative search tool 10 provides certain functional features that support iterative searches on a search engine 20. Iterative search tool 10 may be integrated with search engine 20 or may interface with search engine 20.

Figure 1:
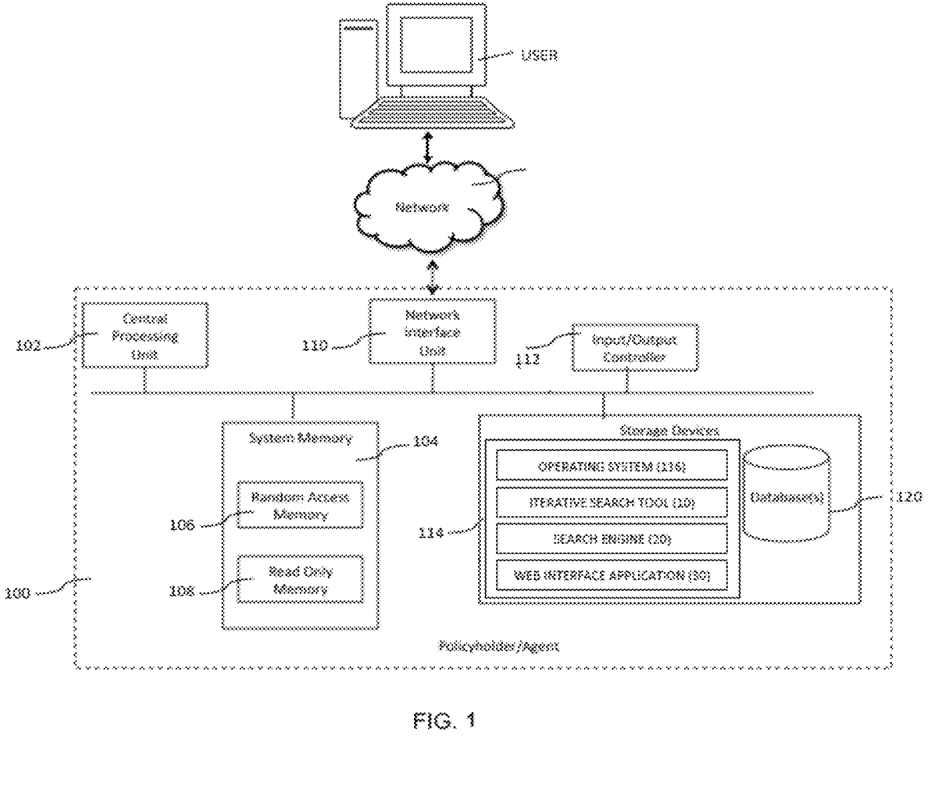
FIG. 1 shows an exemplary computer environment for implementing the iterative search tool of the present application.
Figure 2:
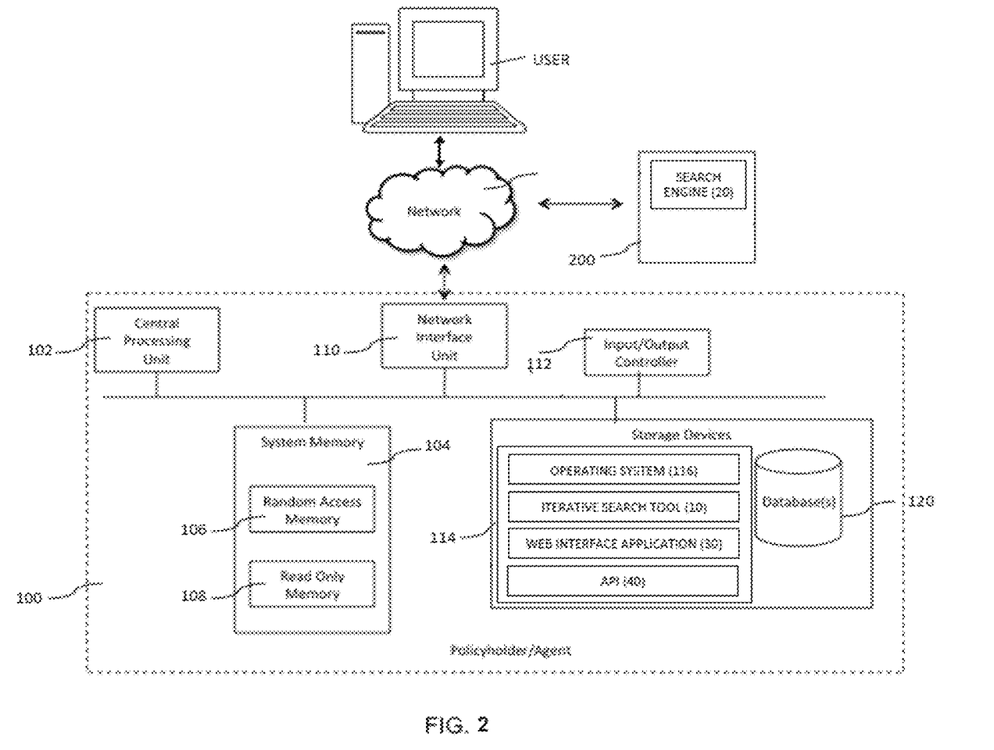
FIG. 2 shows another exemplary computer environment for implementing the iterative search tool of the present application.

Iterative search tool 10 is a computer program implemented on a computer system 100. FIG. 1 shows an exemplary computer system 100 for implementing iterative search tool 10. Computer system 100 comprises at least one central processing unit (CPU) 102, system memory 104, which includes at least one random access memory (RAM) 106 and at least one read-only memory (ROM) 108, at least one network interface unit 110, an input/output controller 112, and one or more data storage devices 114. All of these latter elements are in communication with the CPU 102 to facilitate the operation of the computer system 100.

Computer system 100 may be configured in many different ways. Computer system 100 may be a conventional standalone computer or alternatively, the function of computer system 100 may be distributed across multiple computing systems and architectures. In some embodiments, computer system 100 may be configured in a distributed architecture, wherein databases and processors are housed in separate units or locations. Some such units perform primary processing functions and are connected via a network interface unit to a communications hub or port that serves as a primary communication link with other units. A variety of communications protocols may be part of the system, including but not limited to: Ethernet, SAP®, SAS®, ATP, BLUETOOTH®, GSM and TCP/IP.

CPU 102 comprises a processor, such as one or more conventional microprocessors and one or more supplementary co-processors such as math co-processors. CPU 102 is in communication with the network interface unit 110 and input/output controller 112, through which CPU 102 communicates with other devices such as other servers, user terminals, or devices. CPU 102 is also in communication with data storage device 114. Data storage device 114 may comprise an appropriate combination of magnetic, optical and/or semiconductor memory, and may include, for example, RAM, ROM, flash drive, an optical disc such as a compact disc and/or a hard disk or drive. CPU 102 and data storage device 114 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, CPU 102 may be connected to data storage device 114 via the network interface unit 110.

Data storage device 114 may store, for example, (i) an operating system 116 for computer system 100; (ii) one or more applications (e.g., computer program code and/or a computer program product) adapted to direct CPU 102 in accordance with the present application; and/or (iii) database(s) 120 adapted to store information that may be utilized to store information required by the program.

Figure 3:
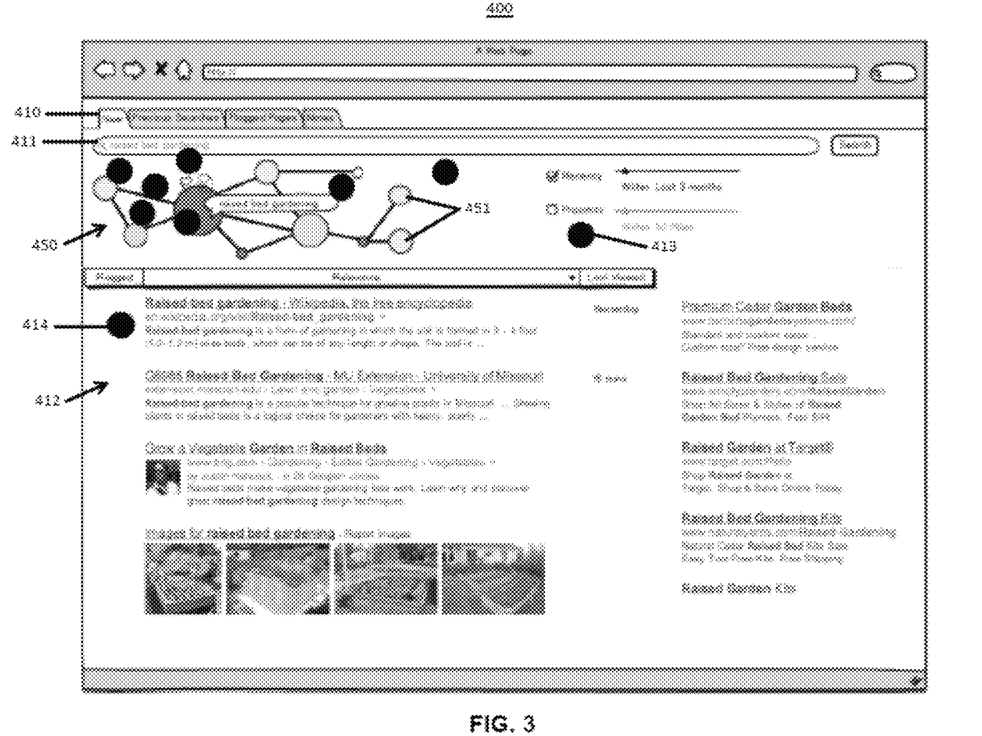
FIGS. 3-9 show various views of the web-based graphical user interface for the iterative search tool.

Various applications may be executed by computer system 100—including Iterative Search Tool 10, Search Engine 20 and Web Interface Application 30. While Iterative Search Tool 10 and Search Engine 20 are shown as separate programs, they may be integrated into a single program. Alternatively, as shown in FIG. 3, Search Engine 20 may be maintained on a remote third-party computer system 200, which is accessed by and connected to computer system 100 through a network 300. In such an embodiment where Search Engine 20 resides on a remote third-party computer system 200, Iterative Search Tool 10 accesses Search Engine 20 using an Application Program Interface 40 (API).

Web Interface Application 30 is adapted to generate a web-based graphical user interface 400 for communicating with remote user computing devices via a network. A remote user computing device may be any suitable device that is capable of communication with Iterative Search Tool 10 via the web-based graphical user interface 400, such as a Personal Computer (PC), a portable computing device such as a Personal Digital Assistant (PDA) or smart-phone type device, or any other appropriate storage and/or communication device. While Web Interface Application 30 may be implemented on computer system 100, Web Interface Application 30 may alternatively be implemented on a separate computer system in communication with computer system 100.

The operating system 116 and/or applications may be stored, for example, in a compressed, an uncompiled and/or an encrypted format, and may include computer program code. The instructions of the computer program code may be read into a main memory of the processor from a computer-readable medium other than the data storage device 114, such as from the ROM 106 or from the RAM 108. While execution of sequences of instructions in the program causes processor 102 to perform the process steps described herein, hard-wired circuitry may be used in place of, or in combination with, software instructions for implementation of the processes of the present application. Thus, embodiments of the present application are not limited to any specific combination of hardware and software.

Applications may also be implemented in programmable hardware devices such as field programmable gate arrays, programmable array logic, programmable logic devices or the like. Applications may also be implemented in software for execution by various types of computer processors. An application of executable code may, for instance, comprise one or more physical or logical blocks of computer instructions, which may, for instance, be organized as an object, procedure, process or function. Nevertheless, the executables of an identified application need not be physically located together, but may comprise separate instructions stored in different locations which, when joined logically together, comprise the application and achieve the stated purpose for the application such as implementing the business rules logic prescribed by computer system 100. An application of executable code may be a compilation of many instructions, and may even be distributed over several different code partitions or segments, among different programs, and across several devices.

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 102 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Database(s) 120 may store user account information and electronic records that are identified and selected via Iterative Search Tool 10 and Search Engine 20. Database(s) 120 may include a database management system (DBMS) software of a relational database type, such as a DB2 UNIVERSAL DATABASE™ provided by International Business Machines Corporation, an Access™ product provided by Microsoft Corporation or an Oracle® Database product provided by Oracle Corporation for storing and processing information. In some embodiments, database(s) 120 may also provide certain database query functions such as generation of structured query language (SQL) in real time to access and manipulate the data.

Note that any devices described herein may communicate via one or more communication networks, which may be one or a combination of a Local Area Network (LAN), a Metropolitan Area Network (MAN), a Wide Area Network (WAN), a proprietary network, a Public Switched Telephone Network (PSTN), a Wireless Application Protocol (WAP) network, a BLUETOOTH® network, a wireless LAN network, and/or an Internet Protocol (IP) network such as the Internet, an intranet, or an extranet.

Iterative Search Tool 10 is executed by CPU 102 of computer system 100 to provide a web-based graphical user interface 400 with features that support iterative searches on Search Engine 20. The various features of Iterative Search Tool 10 will be described with reference to the various views of the web-based graphical user interface 400 shown in FIGS. 3-9. In the embodiment shown in FIGS. 3-9, Iterative Search Tool 10 provides a web-based graphical user interface 400 with a set of features that supplement a third-party Search Engine 20 in a browser. In other words, in the embodiment shown in FIGS. 3-9, Iterative Search Tool 10 provides a user interface shell that adds a layer of functionality to search results generated by a third-party browser-based Search Engine 20. Iterative Search Tool 10 may connect to Search Engine 20 via a customized API 40. However, it should be noted that Iterative Search Tool 10 may alternatively be fully integrated with Search Engine 20.

Iterative Search Tool 10 may be implemented as a SaaS search tool that requires login and identity verification. Login procedure with specific User ID. Search query history saved and associated with the specific User ID. Computer system 100 can grant a user access to Iterative Search Tool 10 upon authentication of the user through a login process via user interface 400 using a previously established customer ID and password. Once the computer system 100 authenticates the user's ID and password, the user is granted access to Iterative Search Tool 10.

Figure 4:
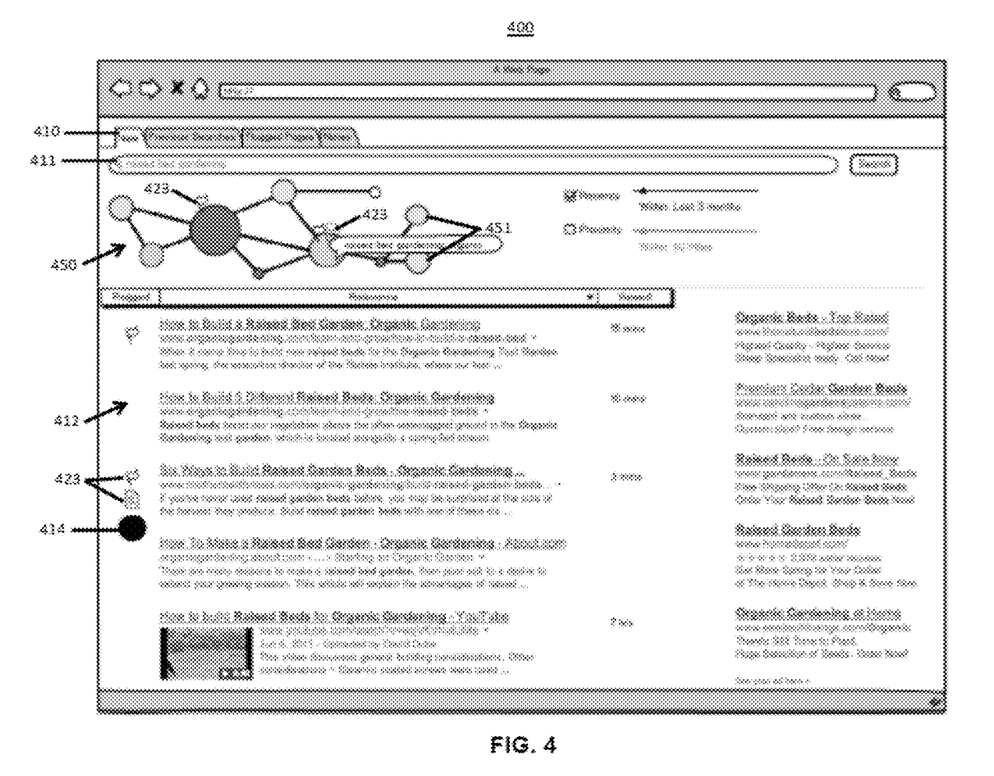

Web-based graphical user interface 400 provides various tabs/pages for accessing various features provided by Iterative Search Tool 10. For example, web-based graphical user interface 400 provides a tab 410 for conducting new searches, a tab 420 for accessing saved previous searches, a tab 430 for accessing saved flagged pages and a tab 440 for accessing saved notes. As shown in FIGS. 3 and 4, tab 410 of user interface 400 for conducting new searches includes one or more search fields 411 for entering a search query. Every search query entered by a user is saved and associated with the User ID. Accordingly, all of the search queries associated with a User ID can later be viewed and accessed.

Figure 10:
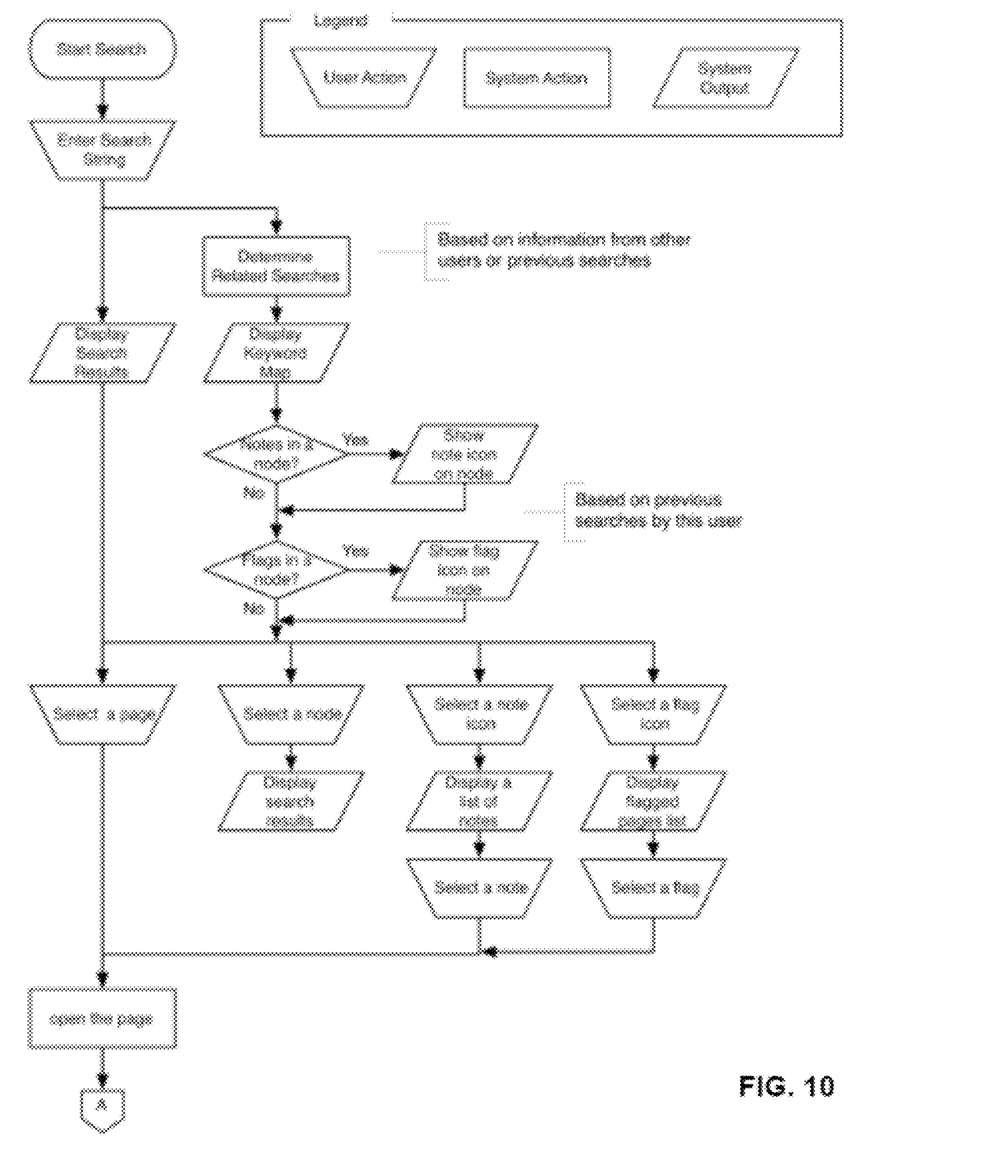
FIG. 10 shows a flowchart for executing a new search.

Tab 410 of user interface 400 also includes a search results list 412 for displaying the search results generated by Search Engine 20 in response to the search query entered in search field 411. Tab 410 of user interface 400 further includes one or more search controls 413 for filtering the search results generated by Search Engine 20 in response to the search query entered in search field 411 and displayed in search results list 412. Additionally, Iterative Search Tool 10 may allow users to generate customizable search templates that have pre-defined search fields and/or filters. FIG. 10 shows a flowchart depicting the operation of Iterative Search Tool 10 to perform a new search via tab 410 of user interface 400.

Figure 8:
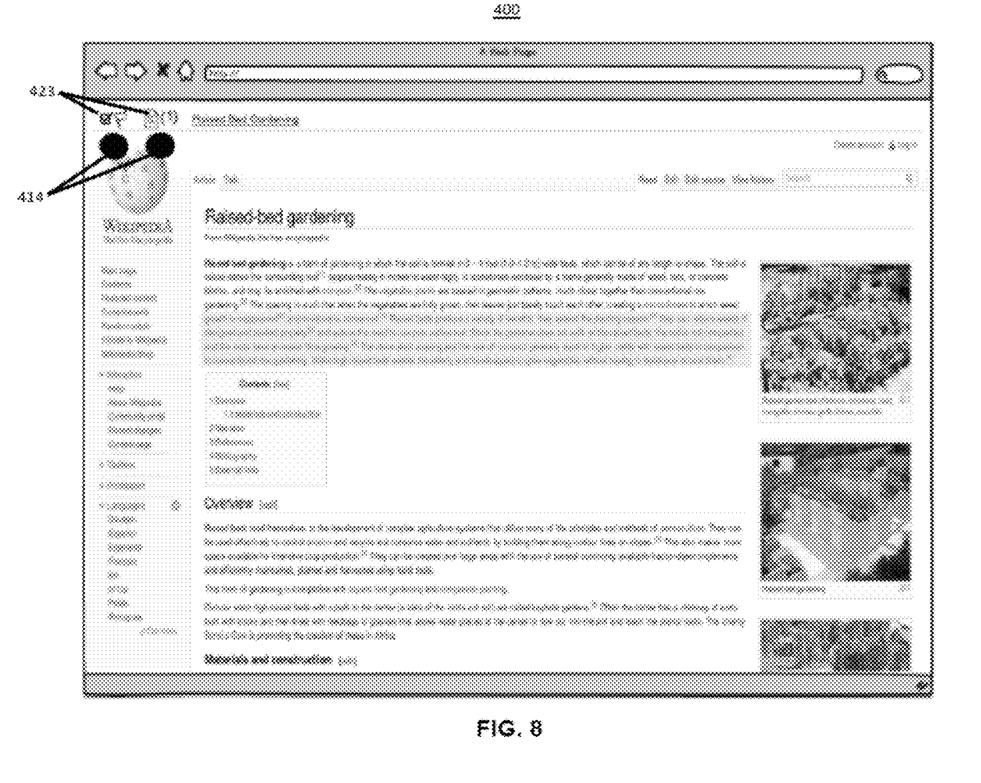
Figure 9:
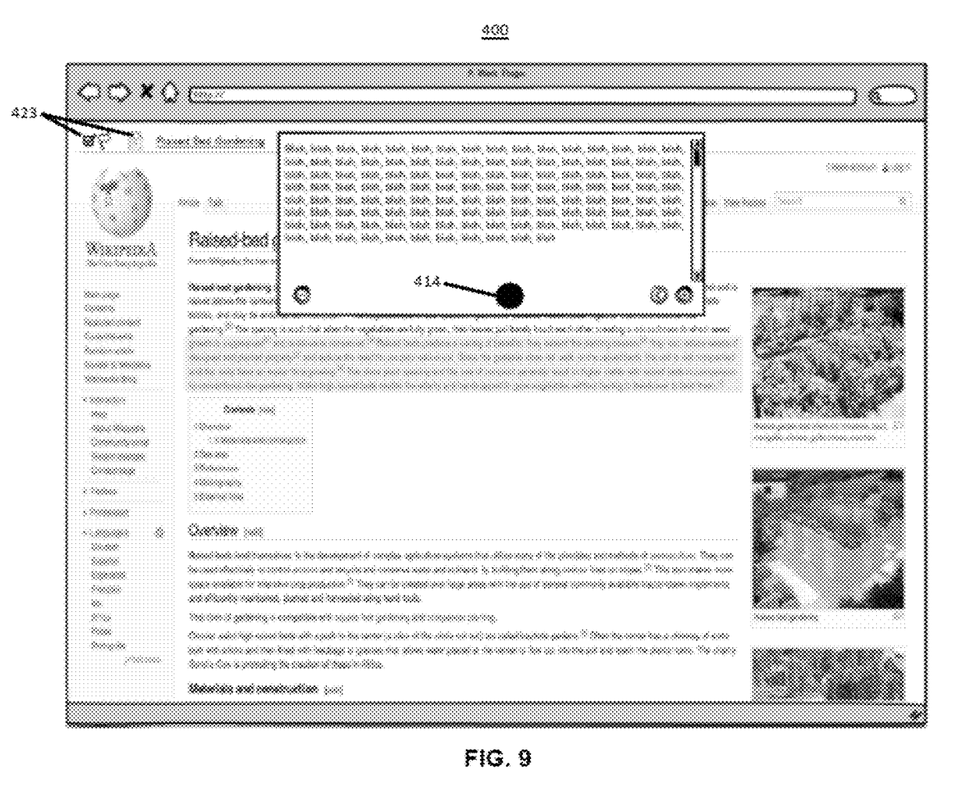
Figure 12:
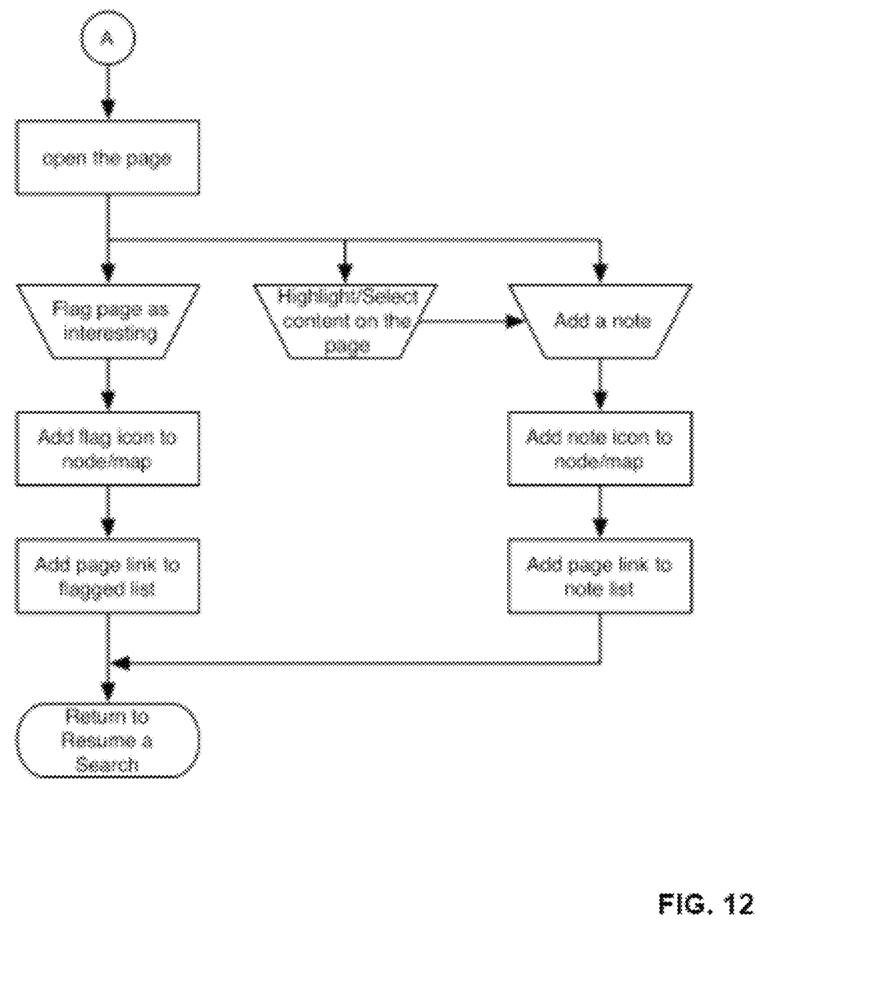
FIG. 12 shows a flowchart for interacting with a selected search result.

Search results list 412 is a listing of links to search results that are responsive to a search query. The links can be selected to view the corresponding responsive search result. For example, FIG. 8 shows a search result selected from search results list 412. Further, FIG. 12 shows a flowchart depicting the operation of Iterative Search Tool 10 to display a selected search result via user interface 400. User interface 400 provides input controls 414 that a user can use to identify a search result as relevant to a search query (e.g., flag), to highlight certain sections of a search result (e.g., highlighting tool) and to annotate certain sections of a search result (e.g., sticky note). When a user flags, highlights and/or annotates a search result, the link to the flagged, highlighted and/or annotated search result is saved and associated with the corresponding User ID and executed search query in database 120 of computer system 100. For example, FIGS. 8 and 9 show a search result selected from search results list 412, which has been flagged, highlighted and annotated.

Tab 410 of user interface 400 additionally includes a visual map 450 illustrating the entered search query as well as other suggested search queries related to the entered search query. The entered search query and the suggested search queries may be illustrated as a series of nodes 451 connected with lines 452 that depict the relationship between the entered search query and the suggested search queries. Visual indicators (e.g., size and color of nodes) can be used to indicate characteristics, such as quality and quantity of the search results, for the search query associated with each node. The connecting lines are used to represent a state of the search, such as relationship to previously performed searches, relationship to flagged, highlighted or annotated results, etc.

If a user selects a node 451 for a suggested search query in the visual map 450, interface 400 displays the search query corresponding to that node and Search Engine 20 executes the corresponding search query and interface 400 displays a search results list 412 for the executed search query. User interface 400 provides input controls 414 that a user can use to identify a search result as relevant to a search query (e.g., flag), to highlight certain sections of a search result (e.g., highlighting tool) and to annotate certain sections of a search result (e.g., sticky note). When a user flags, highlights and/or annotates a search result, the flagged, highlighted and/or annotated search result is saved and associated with the corresponding User ID and executed search query in database 120 of computer system 100.

Visual map 450 includes visual indicators 423 (e.g., icons) to indicate whether a user has previously flagged a search result associated with a node, has highlighted a search result associated with a node 451, or has annotated a search result associated with a node 451. The same visual indicators 423 can also be used in search results list 412 to indicate whether certain search results have been fagged, highlighted and/or annotated. Visual indicators 423 can also be used to indicate the number of annotations associated with a search result.

A Neural Network learning engine generates the suggested search queries. The Neural Network learning engine suggests contextually appropriate search queries to pursue, which are displayed in the visual map 450 as nodes 451. The Neural Network learning engine also automatically adjusts its search query suggestions based on search results that are selected, flagged, highlighted and/or annotated. Further, the Neural Network learning engine learns from each user's search behavior and transfers this knowledge to other users' searches. Accordingly, the Neural Network learning engine becomes more powerful with each use and can develop an aggregated knowledge repository for a specified group of users. The Neural Network learning engine learns from a specific user group's previous searches and can tailor is suggested search queries and or search results list based on aggregate user behaviors within the specified user group. Thus, different knowledge bases can be developed for different user groups (e.g., different companies). Therefore, the Iterative Search Tool 10 creates an institutional memory of previous users' searches that later helps other users. This Iterative Search Tool 10 is therefore optimized specifically for a user group's domain.

Figure 5:
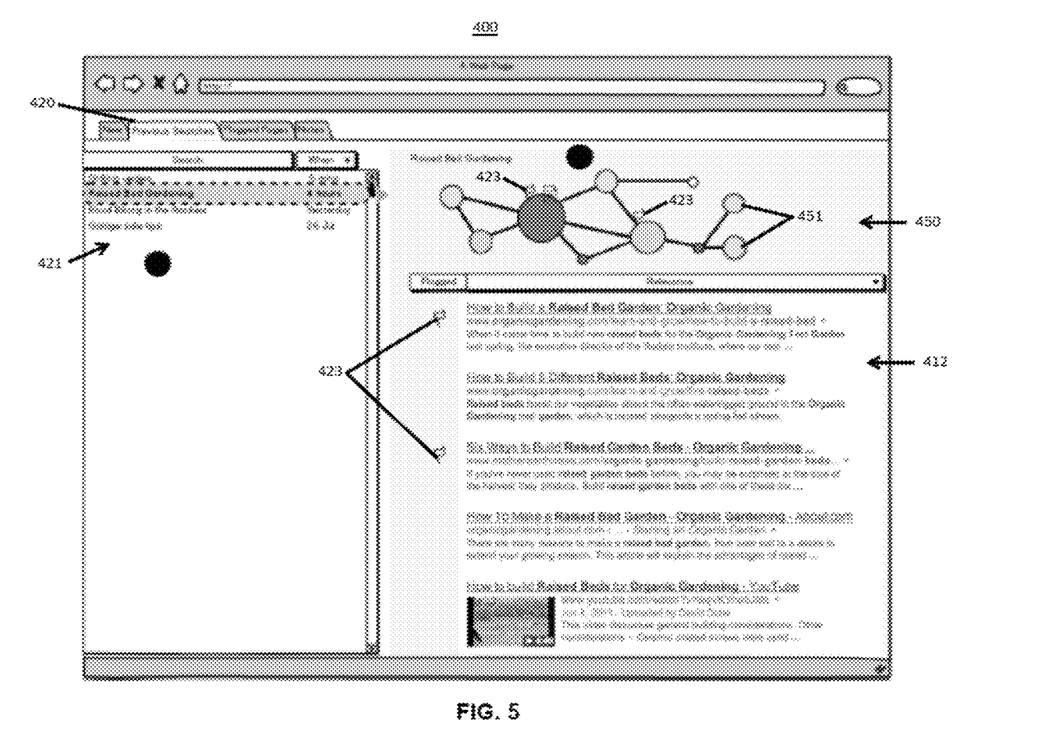
Figure 11:
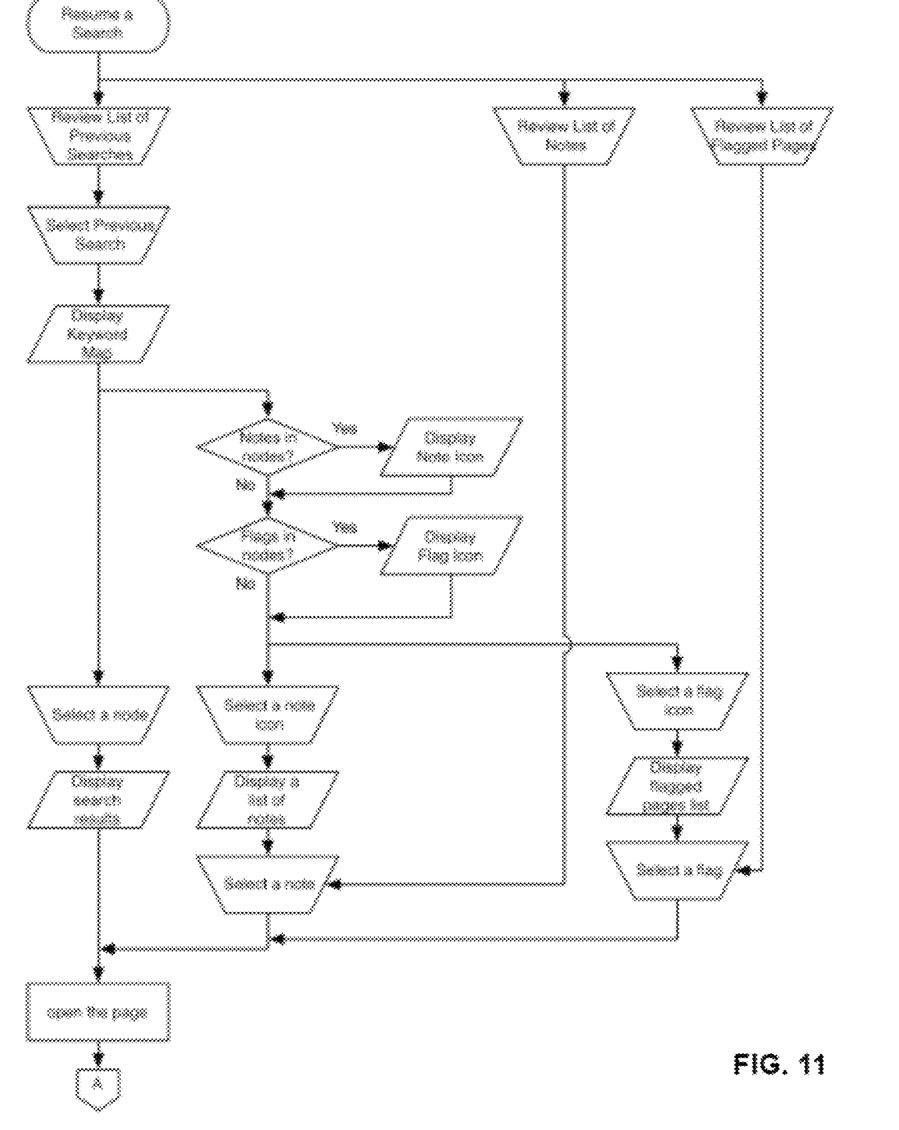
FIG. 11 shows a flowchart for resuming a previous search.

As shown in FIG. 5, tab 420 of user interface 400 for accessing previous searches includes a listing 421 of search queries that were previously executed, saved and associated with a User ID. FIG. 11 shows a flowchart depicting the operation of Iterative Search Tool 10 to resume a previous search via tab 420 of user interface 400. If a user selects a search query from the listing 421 of saved search queries, a visual map 450 and a search results list 412 corresponding to the selected saved search query is displayed on interface 400. Visual map 450 includes visual indicators 423 (e.g., icons) to indicate whether a user has previously flagged a search result associated with a node, has highlighted a search result associated with a node 451, or has annotated a search result associated with a node 451. Also, the same visual indicators 423 can be used in search results list 412 to indicate whether certain search results have been fagged, highlighted and/or annotated. Visual indicators 423 can also be used to indicate the number of annotations associated with a search result.

Figure 6:
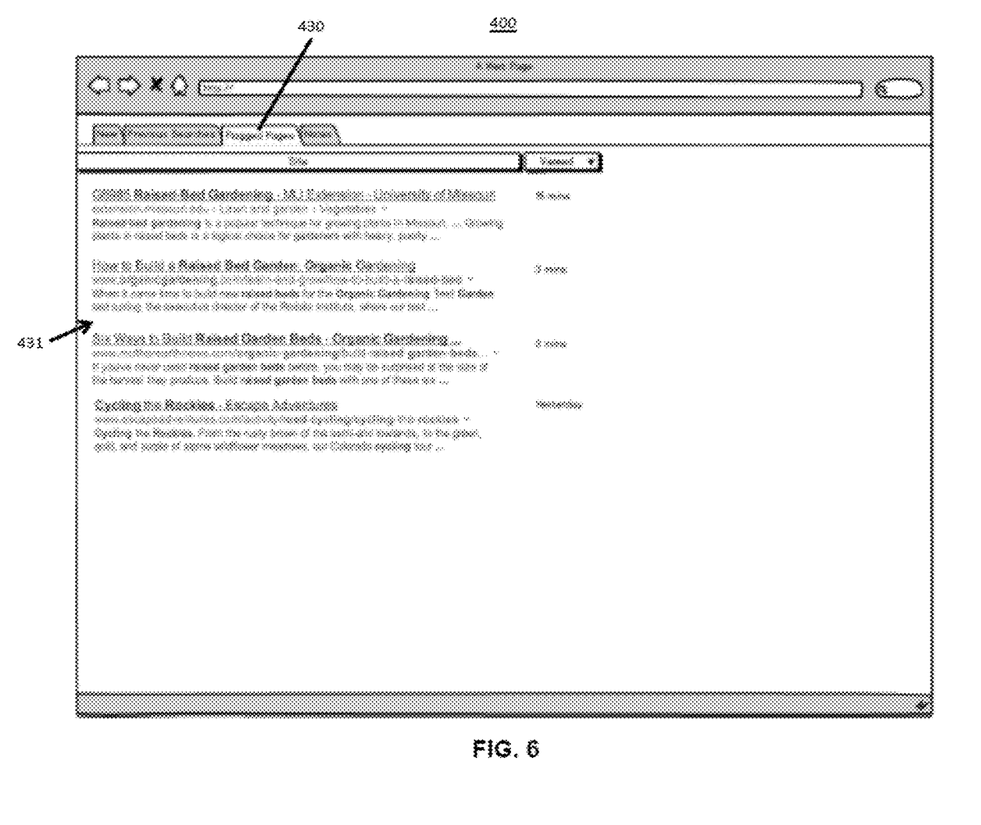

As shown in FIG. 6, tab 430 of user interface 400 for accessing saved flagged pages includes a listing 431 of search results that were previously flagged and associated with a User ID. If a user selects a flagged search result from listing 431, the search result is displayed on interface 400 as shown in FIG. 8, including any previously saved highlighted sections of the search result.

Figure 7:
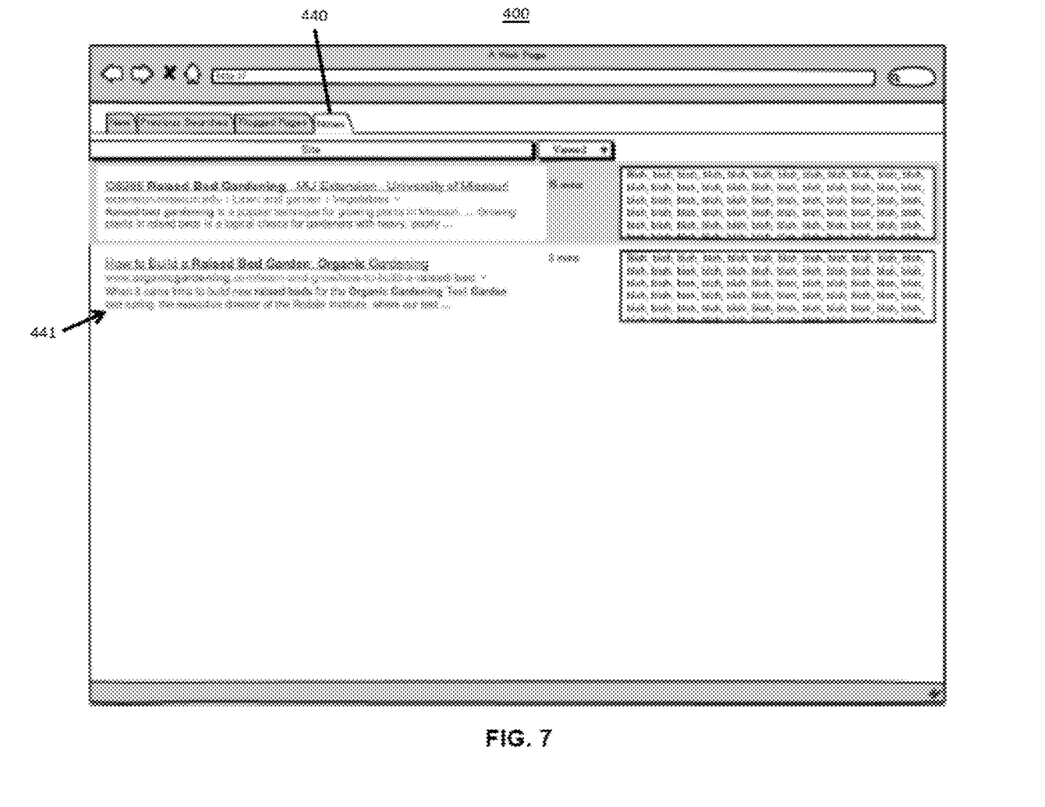

As shown in FIG. 7, tab 440 of user interface 400 for accessing saved notes includes a listing 441 of notes that were previously created and associated with a search result and User ID. If a user selects a note from listing 441, the search result and note are displayed on interface 400 as shown in FIG. 9.

The Iterative Search Tool 10 described above provides a number of advantages. Simple search engines fail to recognize that research is a cognitive process that may require expanding a user's understanding of the domain before narrowing the search focus. The Iterative Search Tool 10 can broaden a user's perspective with suggested search queries before allowing a user to focus on particularly relevant search results.

Also, the Iterative Search Tool 10 also provides better management of information gathered using search engines. Conventional search engines treat each search as a new, independent, and unique search. Further, conventional Internet browsers provide only rudimentary tools for supporting searches, such as browser history and bookmarks. Thus, the tools in conventional search engines and Internet browsers do not provide support for iterative searches. The Iterative Search Tool 10 obviates the need for bookmarking search results by saving search query history and providing tools for highlighting and annotating search results. The Iterative Search Tool 10 allows a user to revisit a previous search with the necessary context to continue to pursue the search over multiple sessions. Further, the Iterative Search Tool 10 allows a user to share a search so that it does not have to be restarted anew if more than one user is investigating the search.

Further, the Iterative Search Tool 10 can be used to supplement a third-party search engine in a browser to improve search experience by supporting iterative search behavior. Thus, the Iterative Search Tool 10 provides added functionality without requiring users to change their search engines or database preferences. Further, the Iterative Search Tool 10 can be used to search a dedicated complex database, such as a legal or technical database.

While various embodiments have been described, it will be appreciated by those of ordinary skill in the art that modifications can be made to the various embodiments without departing from the spirit and scope of the present application as a whole.

The invention claimed is:

1. A system for managing iterative searches of electronic records, comprising:
    a data storage device comprising a database and an iterative search engine; and
    at least one processor connected to said data storage device for executing said iterative search engine to:
    communicate with at least one remote device via a network;
    render a web-based graphical user interface on the at least one remote device;
    communicate with the at least one remote device to receive a search query and search results based on the search query;
    save the received search query and search results in the database;
    generate a listing of the search results on the web-based graphical user interface on the at least one remote device in response to the received search query;

receive a user input via the web-based graphical user interface flagging, highlighting and/or annotating a selected one of the search results; and save the selected one of the search results and the corresponding flag, highlight and/or annotation in association with the corresponding saved search query;

wherein the at least one processor further executes said iterative search engine to: generate one or more suggested search queries in response to the received search query;

wherein the at least one processor further executes said iterative search engine to: display the one or more suggested search queries on the web-based graphical user interface on the at least one remote device in the form of a visual map comprising a group of interconnected nodes, wherein each of the nodes represents the received search query and/or one of the suggested search queries; and wherein the visual map includes a visual indicator for at least one node representing a search query that indicates whether the search results associated with the node have been flagged, highlighted and/or annotated.

2. The system according to claim 1, wherein the suggested search queries are generated by a Neural Network based on the user's past search behavior and/or other users' past search behavior.

3. The system according to claim 1, wherein the at least one processor further executes said iterative search engine to:

receive a user selection of a suggested search query corresponding to one of the nodes on the visual map; and generate a listing of search results on the web-based graphical user interface on the at least one remote device in response to the selected suggested search query.

4. The system according to claim 1, wherein the at least one processor further executes said iterative search engine to: generate a listing of saved search results that have been flagged, highlighted or annotated.

5. The system according to claim 4, wherein the at least one processor further executes said iterative search engine to: receive a selection of one the saved search results that have been flagged, highlighted or annotated; and display on the web-based graphical user interface on the at least one remote device the corresponding highlight or annotation corresponding to the selected one of the saved search results.

6. The system according to claim 1, wherein the visual indicator comprises a size and/or color of the at least one node.

7. The system according to claim 1, wherein the suggested search queries are generated based on an aggregate of past search behavior of a specified group of users.

8. The system according to claim 1, wherein the at least one processor further executes said iterative search engine to generate the one or more suggested search queries in response to the search results that have been flagged, highlighted and/or annotated by the user.

9. The system according to claim 1, wherein the at least one processor further executes said iterative search engine to save a listing of saved search results that have been flagged, highlighted or annotated, and to save the corresponding flagged information, highlighted information or annotations associated with each saved search result in the listing.

10. A system for managing iterative searches of electronic records, comprising:

a data storage device comprising a database and an iterative search tool; and at least one processor connected to said data storage device for executing said iterative search tool to:

communicate with at least one remote device and at least one remote search engine via a network;

render a web-based graphical user interface on the at least one remote device;

receive a search query from the at least one remote device;

save the search query in the database;

send the search query to the at least one remote search engine;

receive search results from the at least one remote search engine in response to the sent search query;

generate a listing of the search results received from the at least one remote search engine on the web-based graphical user interface on the at least one remote device in response to the sent search query;

receive a user input via the web-based graphical user interface flagging, highlighting and/or annotating a selected one of the search results; and save the selected one of the search results and corresponding flag, highlight and/or annotation in the database in association with the corresponding sent search query;

wherein the at least one processor further executes said iterative search tool to: generate suggested search queries in response to the sent search query;

wherein the at least one processor further executes said iterative search tool to: display the suggested search queries on the web-based graphical user interface on the at least one remote device in the form of a visual map comprising a group of interconnected nodes, wherein each of the nodes represents the sent search query and/or one of the suggested search queries; and wherein the visual map includes a visual indicator for at least one node representing a search query that indicates whether the search results associated with the node have been flagged, highlighted and/or annotated.

11. The system according to claim 10, wherein the suggested search queries are generated by a Neural Network based on the user's past search behavior and/or other users' past search behavior.

12. The system according to claim 10, wherein the at least one processor further executes said iterative search tool to:

receive a user selection of a suggested search query corresponding to one of the nodes on the visual map;

send the selected suggested search query to the at least one remote search engine;

receive search results from the at least one remote search engine in response to the selected suggested search query; and generate a listing of search results on the web-based graphical user interface on the at least one remote device in response to the selected suggested search query.

13. The system according to claim 10, wherein the at least one processor further executes said iterative search tool to: generate a listing of saved search results that have been flagged, highlighted or annotated.

14. The system according to claim 13, wherein the at least one processor further executes said iterative search tool to:

receive a selection of one the saved search results that have been flagged, highlighted or annotated; and display on the web-based graphical user interface on the at least one remote device the corresponding highlight or annotation corresponding to the selected one of the saved search results.

15. A non-transitory, tangible computer-readable medium storing instructions adapted to be executed by a computer processor to perform a method for facilitating iterative searching, said method comprising the steps of:
- communicating with at least one remote device and at least one remote search engine via a network;
- rendering a web-based graphical user interface on the at least one remote device;
- receiving a search query from the at least one remote device;
- saving the search query in a database;
- sending the search query to the at least one remote search engine;
- receiving search results from the at least one remote search engine in response to the sent search query;
- generating a listing of the search results received from the at least one remote search engine on the web-based graphical user interface on the at least one remote device in response to the sent search query;
- receiving a user input via the web-based graphical user interface flagging, highlighting and/or annotating a selected one of the search results; and
- saving the selected one of the search results and corresponding flag, highlight and/or annotation in the database in association with the corresponding sent search query;
- wherein the method further comprises the step of: generating suggested search queries in response to the sent search query;
- wherein the method further comprises the step of: displaying the suggested search queries on the web-based graphical user interface on the at least one remote device in the form of a visual map comprising a group of interconnected nodes, wherein each of the nodes represents the sent search query and/or one of the suggested search queries; and
- wherein the visual map includes a visual indicator for at least one node representing a search query that indicates whether the search results associated with the node have been flagged, highlighted and/or annotated.

16. The non-transitory, tangible computer-readable medium of claim 15, wherein the method further comprises the steps of:
- receiving a user selection of a suggested search query corresponding to one of the nodes on the visual map;
- sending the selected suggested search query to the at least one remote search engine;
- receiving search results from the at least one remote search engine in response to the selected suggested search query; and
- generating a listing of search results on the web-based graphical user interface on the at least one remote device in response to the selected suggested search query.

17. The non-transitory, tangible computer-readable medium of claim 15, wherein the method further comprises the step of: generating a listing of saved search results that have been flagged, highlighted or annotated.

18. The non-transitory, tangible computer-readable medium of claim 17, wherein the method further comprises the steps of:
- receiving a selection of one the saved search results that have been flagged, highlighted or annotated; and
- displaying on the web-based graphical user interface on the at least one remote device the corresponding highlight or annotation corresponding to the selected one of the saved search results.

19. The non-transitory, tangible computer-readable medium of claim 15, wherein the method further comprises the step of generating the one or more suggested search queries in response to the search results that have been flagged, highlighted and/or annotated by the user.

20. The non-transitory, tangible computer-readable medium of claim 15, wherein the method further comprises the step of generating suggested search queries based on an aggregate of past search behavior of a specified group of users.

* * * * *